(12) United States Patent
Gruca et al.

(10) Patent No.: US 6,926,827 B2
(45) Date of Patent: Aug. 9, 2005

(54) FUEL DISPENSER FILTER WITH REMOVABLE FILTER MEDIA

(75) Inventors: Michael J. Gruca, Mt. Carmel, IL (US); David E. Hahn, Albion, IL (US); W. Scott Atteberry, West Salem, IL (US)

(73) Assignee: Champion Laboratories, Inc., Albion, IL (US)

( * ) Notice: Subject to any disclaimer, the term of this patent is extended or adjusted under 35 U.S.C. 154(b) by 162 days.

(21) Appl. No.: 10/428,563

(22) Filed: May 2, 2003

(65) Prior Publication Data

US 2004/0217045 A1 Nov. 4, 2004

(51) Int. Cl.[7] .................. B01D 27/08; B01D 27/10; B01D 35/153; B01D 35/157
(52) U.S. Cl. ............. 210/234; 210/235; 210/96.1; 210/450; 210/314; 210/318; 210/799
(58) Field of Search .................... 210/234, 235, 210/96.1, 450, 314, 318, 799

(56) References Cited

U.S. PATENT DOCUMENTS

| | | | | |
|---|---|---|---|---|
| 3,040,894 A | * | 6/1962 | Pall | 210/90 |
| 3,045,826 A | * | 7/1962 | Smith et al. | 210/90 |
| 3,080,972 A | * | 3/1963 | Smith | 210/90 |
| 3,283,907 A | * | 11/1966 | Whiting | 210/234 |
| 3,300,050 A | * | 1/1967 | Perry | 210/234 |
| 3,317,046 A | * | 5/1967 | Landree et al. | 210/130 |
| 4,539,107 A | * | 9/1985 | Ayers | 210/96.1 |
| 4,588,500 A | * | 5/1986 | Sprenger et al. | 210/100 |
| 5,215,655 A | * | 6/1993 | Mittermaier | 210/234 |
| 5,698,093 A | * | 12/1997 | Pyle et al. | 210/136 |
| 6,117,311 A | * | 9/2000 | Stockhowe et al. | 210/109 |
| 6,645,373 B2 | * | 11/2003 | Gruca | 210/96.1 |

FOREIGN PATENT DOCUMENTS

ZA 97/04154 * 2/1998

\* cited by examiner

*Primary Examiner*—Thomas M. Lithgow
(74) *Attorney, Agent, or Firm*—Olson & Hierl, Ltd.

(57) ABSTRACT

A fuel dispenser filter for filtering fuel is adapted to be connected to a support in a fuel distribution system. The filter comprises a housing including an adaptor constructed and arranged to be secured to the support and a bowl operatively connected to the adaptor. A stud/spacer is secured in the adaptor. The stud/spacer defines a centrally disposed outlet flow passage and outwardly disposed inlet flow passages. A sleeve member is movably supported in the adaptor between the stud/spacer and the adaptor. The sleeve member is constructed and arranged to open and close the fuel flow through the inlet flow passages. A filter assembly including filter media is provided in the bowl for filtering the fuel passing through the filter. When the bowl is firmly engaged with the adaptor, the sleeve member is moved to open position to permit the flow of fuel through the filter and when the bowl is removed from the adaptor, the sleeve member is moved to a closed position to stop the flow of fuel. A spring is provided to bias the sleeve member to the closed position when the bowl is removed from the adaptor. Various seals are provided within the filter to confine fuel flow to the desired flow paths.

29 Claims, 5 Drawing Sheets

FUEL DISPENSER FILTER WITH REMOVABLE FILTER MEDIA

BACKGROUND OF THE INVENTION

A. Field of the Invention

This invention pertains to a removable element—type filter to replace the current spin-on type filter used in a dispenser for fuel in gas stations. The removable element-type filter may be retrofit to existing installations to replace current spin-on filters to remove particulate matter in specific fuels. It has provisions to sense water in gasoline and phase separation in an alcohol-gasoline combination. More particularly, the present invention will reduce spillage of fuel during filter changes at a gas station and will reduce the volume of hazardous waste generated with a spin-on type filter.

B. Description of Related Art

It is common in the United States and around the world to use a spin-on filter to filter diesel fuel, gasoline and an alcohol-gasoline combination for particulate matter and sense water in these fuels.

Presently, some spillage will occur during the changing of spin-on type filters. Spin-on filters will overflow as manifolds or other components drain. Spillage will also occur while removing a spin-on filter from the dispenser due to having to tip the full filter to clear dispenser components.

The hazardous waste generated by spin-on type filters is a problem. Spin-on filters are largely constructed of metal. Compressing the spin-on filter unit will reduce volume by approximately two-thirds, but this is still substantial. By way of reference, an average spin-on filter is approximately 4" diameter by 5" tall. The spin-on filter can be reduced to a compressed disc approximately 4" diameter by 1⅝" tall. This size can still be costly to dispose of.

SUMMARY OF THE INVENTION

An object of the present invention is to provide an improved fuel dispenser filter that can be used for diesel, gasoline, and gasoline-alcohol combination fuels and greatly reduces the hazardous wastes generated by filter changes.

Another object of the present invention is to provide an improved fuel dispenser filter to reduce the spillage of fuel during the filter changing process.

A further object of the present invention is to provide an improved fuel dispenser filter with an easily and safely replaceable filter element that removes solid particulate in the fuel.

Yet another object of the present invention is to provide an improved fuel dispenser filter with an easily and safely replaceable filter element that incorporates a chemical fill preparation for sensing phase separation in a alcohol-gasoline blend.

A further object of the present invention is to provide an improved fuel dispenser filter with an easily and safely replaceable filter element that incorporates a water sensing material laminated to the outside thereof for sensing water contamination in the fuel.

Still another object of the present invention is provide an improved fuel dispenser filter having a housing with a removable bowl portion for facilitating replacement of the filter media constructed and arranged so as to reduce the spillage of fuel during filter media changes.

A further object of the present invention is to provide an improved fuel dispenser filter with an easily and safely replaceable filter element that incorporates a means for examining the media and determining the amount and type of contamination the fuel contains.

Still another object of the present invention is to provide an improved fuel dispenser filter having ports to monitor differential pressure across the element assembly to determine when the element is fully plugged and must be replaced, thereby eliminating premature replacement of the element assembly and reducing additional waste.

Yet another object of the present invention is to provide an improved fuel dispenser filter with an easily and safely replaceable filter element that incorporates a safety means to assure that an element must be present before fuel will be allowed to flow.

Other objects and advantages of the present invention will become more apparent hereinafter.

BRIEF DESCRIPTION OF THE DRAWING

There is shown in the attached drawing a presently preferred embodiment of the present invention, wherein like numerals in the various views refer to like elements and wherein;

FIG. 3 is a partial longitudinal cross-section view of the adaptor and associated components of the fuel dispenser filter, with the bowl removed and fuel flow stopped;

DETAILED DESCRIPTION OF THE PRESENT INVENTION

Figure 1:
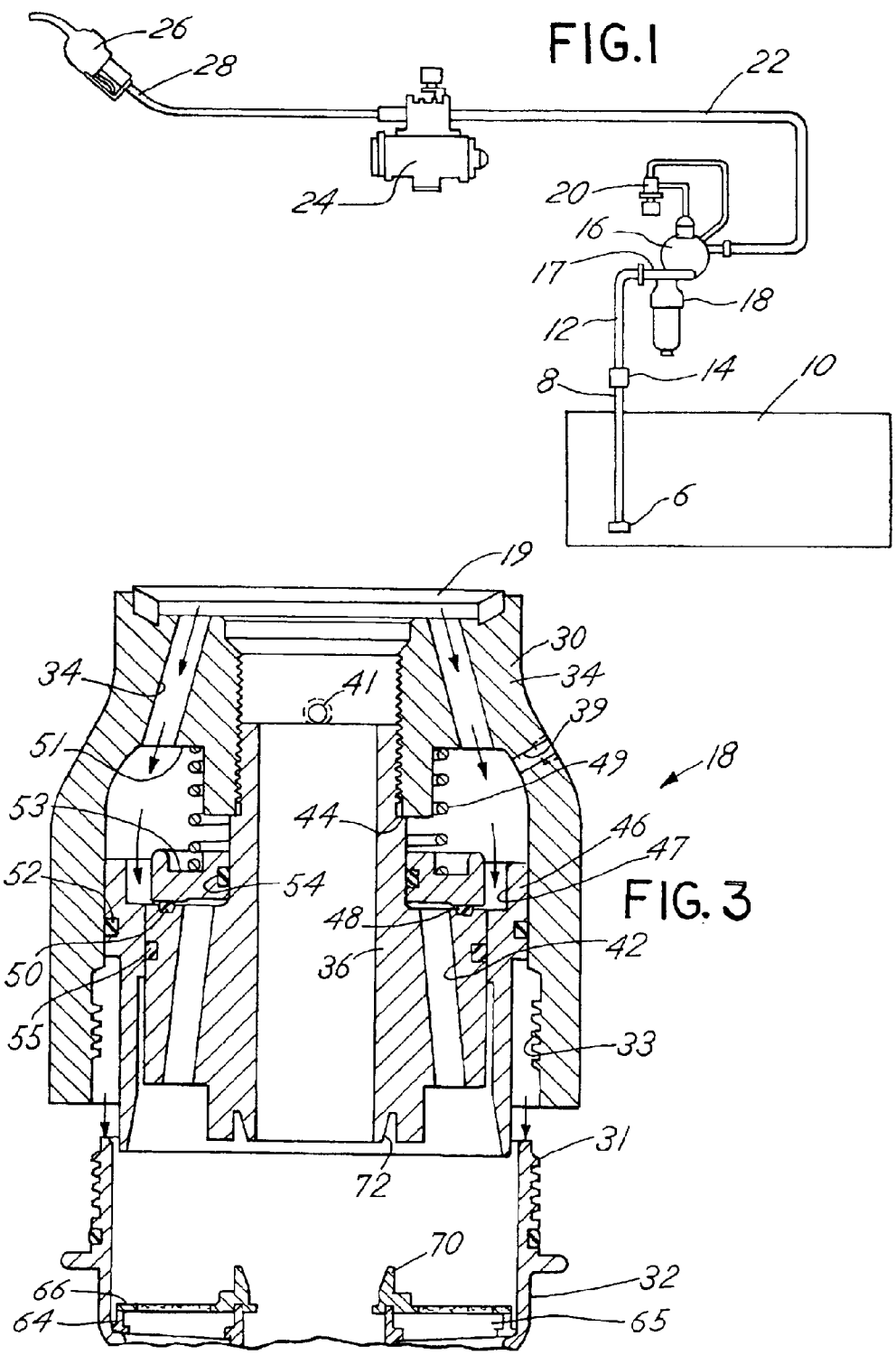
FIG. 1 is a schematic view of a fuel dispenser installation incorporating the removable element type fuel dispenser filter of the present invention.

There is shown in FIG. 1 a typical service station fuel dispenser installation that can incorporate the fuel dispenser filter of the present invention. The installation, which can be a gas station, for example, incorporates a reservoir or storage tank 10 either above the ground or below the ground, which contains the fuel to be dispensed. The fuel can be diesel, gasoline, or a gasoline-alcohol blend. A submersible pump 6 is located on the end of line 8 and submerged in storage tank 10 near the bottom. Line 8 is then connected to shear valve 14. A line 12 is connected from the shear valve 14 and extends upwardly for connection to the fuel dispenser filter 18 of the present invention. The fuel dispenser filter 18 is connected to the manifold 17 of the primary valve 16, which is activated by a two-stage pilot valve 20. Extending from the primary valve 16 is line 22 that communicates with a fuel meter 24 that is connected to a nozzle 26 by a line 28.

In operation, fuel passes from the pump 6 in tank 10, through line 8 to the shear valve 14 and out through line 12. The fuel then passes through the fuel dispenser manifold 17 and filter 18, where it is filtered and strained. Filtered fuel passes through a two-stage pilot valve 20 and primary valve 16, line 22, fuel meter 24, and line 28 to the nozzle 26. Fuel can be discharged from the nozzle 26 into the tank of a vehicle.

Figure 2:
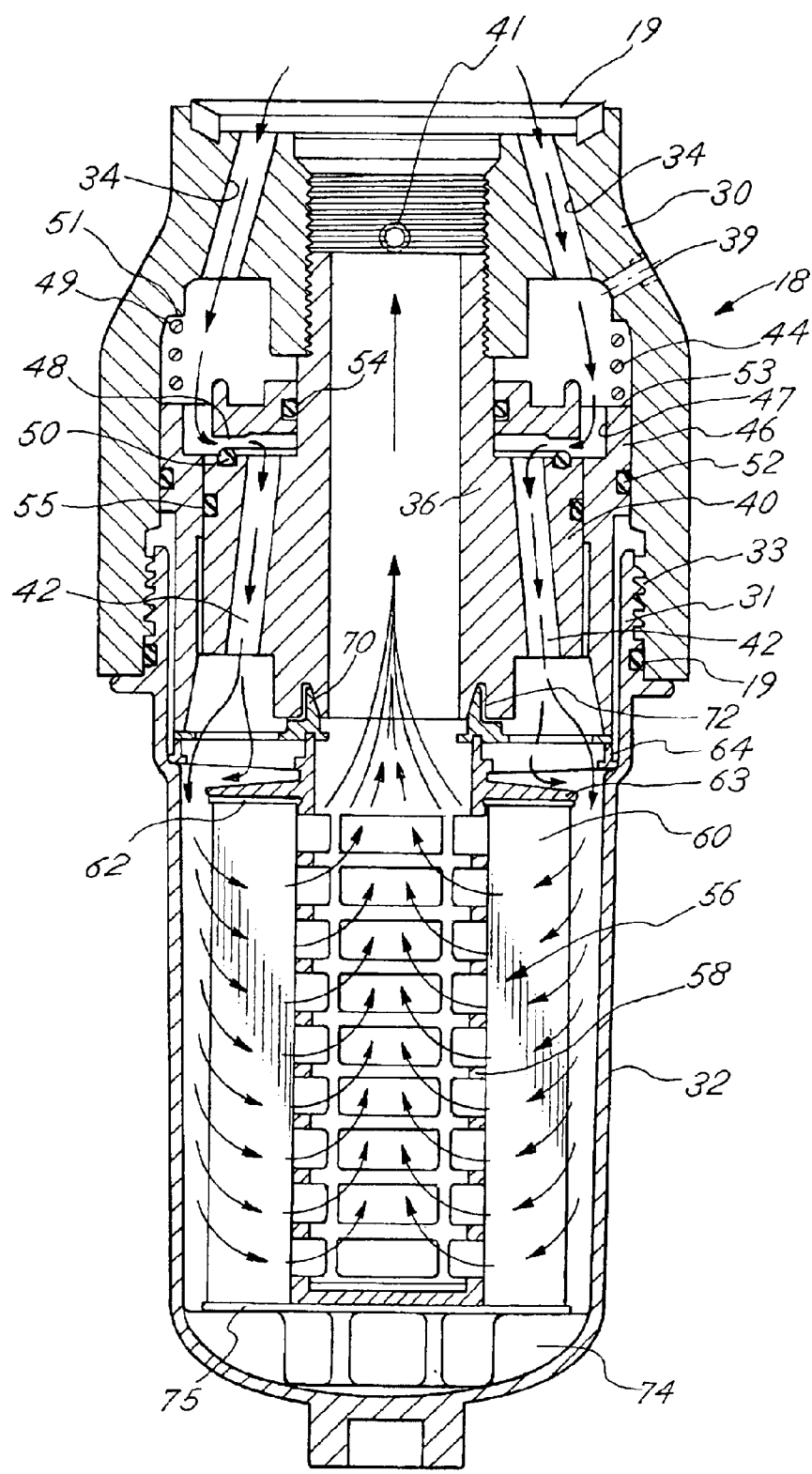
FIG. 2 is a longitudinal cross-section view of the removable element type fuel dispenser filter of the present invention showing the flow path with the fuel dispenser filter of the flow mode.

Turning to FIG. 2, there is better shown fuel dispenser filter 18 of the present invention. The fuel dispenser filter 18 includes an adaptor 30, which is connected to the manifold 17 (FIG. 1), and a bowl 32, which is suitably secured to the adaptor 30 in use. A seal 19 is provided between the adaptor 30 and the manifold. As shown, the bowl 32, which may be made from aluminum, is connected to the adaptor 30 by means of external threads 31 on the upper end of the bowl 32 and internal threads 33 on the lower and of the adaptor 30. By unscrewing the threaded connection, the bowl 32 can be easily removed from the adaptor 30. By screwing the bowl 32 into the adaptor 30, the parts are easily connected. The adaptor 30 and the bowl 32 cooperate to provide the housing for the fuel dispenser filter 18. Provided in the adaptor 30 are a plurality of openings or flow passages 34, which are arranged annularly about the longitudinal axis of the adaptor 30.

Disposed within and connected to the adaptor 30 is a hollow stud/spacer 36. From FIG. 2, it is seen that the upper end of the hollow stud/spacer 36 has external threads which cooperate with internal threads on the adaptor 30. The stud/spacer 36 has flow passages 42 therein. The stud/spacer 36 abuts the shoulder 44 in the adaptor 30.

Slidably carried on the hollow stud/spacer 36 is an O-ring cup or sleeve member 46. The sleeve member 46 is provided with one or more annular slots 47 for communicating the flow passages 34 with the flow passages 42. The surface 48 of the sleeve member 46 comprises a valve surface which seats against the valve seat 50 formed by the O-ring which is seated in a groove or recess in the stud/spacer 36. When the surface 48 is engaged with the valve seat 50, the flow of fuel through the filter 18 is stopped. When the surface 48 is away from the valve seat 50, fuel can flow through the filter 18. Spring 49, which operates between shoulder 51 on the adaptor 30 and the top of the sleeve member 46, urges the sleeve member 46 into contact with the valve seat 50 on the stud/spacer 36 to close the flow path through the filter 18. Incoming fuel under pressure adds in the closing and applying of pressure.

An O-ring or like seal 52 is disposed between the inner surface of the adaptor 30 and the sleeve member 46 to block the flow of fuel between the two members. An O-ring or like seal 54 is disposed in a recess in the sleeve member 46 and seals between the hollow stud/spacer 36 and the sleeve member 46 and seals between the stud/spacer 36 and the sleeve member 46.

To measure the differential pressure within the adaptor in order to determine the state of the filter element, port 39 (FIGS. 2 and 3) is provided in adaptor 30 to measure the upstream pressure of fluid and port 41 is provided in adaptor 30 to measure the downstream pressure of fluid. The pressure differential, as measured by a suitable instrument (not shown), will be indicative of the state of the filter element 60. As the filter element 60 clogs, the pressure differential will increase.

Carried within the bowl 32 is a core assembly 56 which includes a perforated generally annular core 58, preferably molded from plastic, such as nylon, having an annular filter element 60 supported thereon. See FIGS. 2 and 7. The filter element 60 may be comprised of a pleated filter media having an end cap 62 at one end and an end cap 75 at the other end. The filter element may be a cellulose material having a mean pore size of 10 or 30 microns. To sense water in the fuel passing through the filter element 60, a suitable chemical, such as a water absorbing polyacrylate or a starch graft copolymer, may be laminated to the exterior surface of the filter element 60.

The core 58 of the core assembly 56 is provided adjacent its upper end with an outwardly extending flange 63, which abuts the upper end cap 62 of the filter element 60 causing a sealing surface for upper end cap 62 and which functions to deflect fluid from the openings 42 in the stud/spacer 36, as shown by the arrows in FIG. 2.

Figure 4:
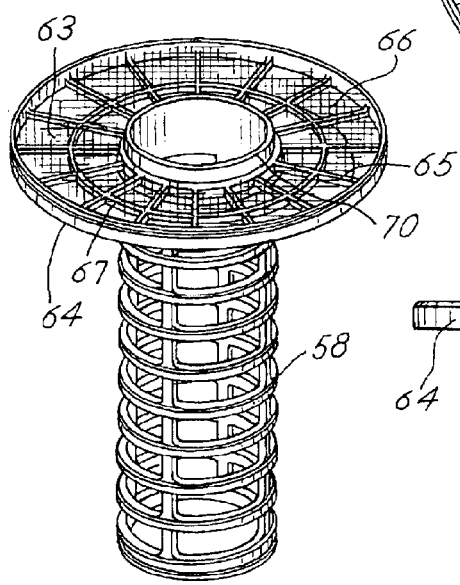
FIG. 4 is a perspective view of the core of the filter element assembly.
Figure 6:
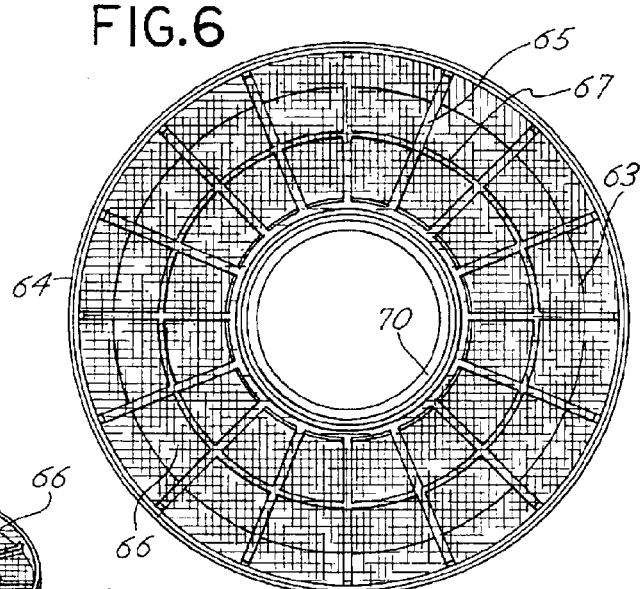
FIG. 6 is a top plan view of the core.
Figure 5:
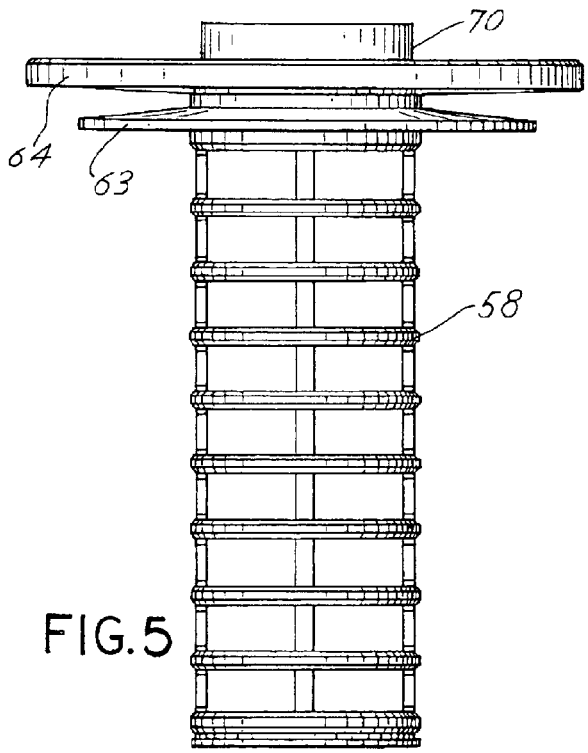
FIG. 5 is an elevation view of the core.

The retainer 64 (FIG. 4) is preferably made of plastic. A fine plastic mesh 66 (FIGS. 4 and 6) for example, a 40-mesh screen material, may be secured to the top of the retainer 64 (FIGS. 2 and 4) to help retain large particulate from getting into the flow stream to the filter media 56. The retainer 64 is comprised of a plurality of radial ribs 65 joined by an annular reinforcing rib or ribs 67. Ribs 65 connect at the inner end to the core 58 and at the outer end to the outer annular wall of the retainer 64. The core assembly includes an upwardly extending tapered seal 70 that is adapted to engage within a generally complementary-shaped recess 72 (FIG. 2) in the bottom of the stud/spacer 36 to seal fuel flow between the stud/spacer 36 and the core assembly 56.

A plurality of spaced apart ribs 74 (FIG. 2) are formed in the bottom of the bowl 32. In one presently preferred embodiment, there are six (6) ribs. The tops of the ribs 74 bear upon the bottom end cap 75 of the core assembly 56 and as the bowl 32 is replaced on the adaptor after a filter media change out, the ribs 74 will urge the core assembly 56 upwardly as viewed in FIG. 2 to firmly seat the seal 70 in the recess 72 of the stud/spacer 36. The seal 70 and the recess 72 cooperate to prevent the incoming dirty fuel from mixing with the out going clean fuel.

Figure 7:
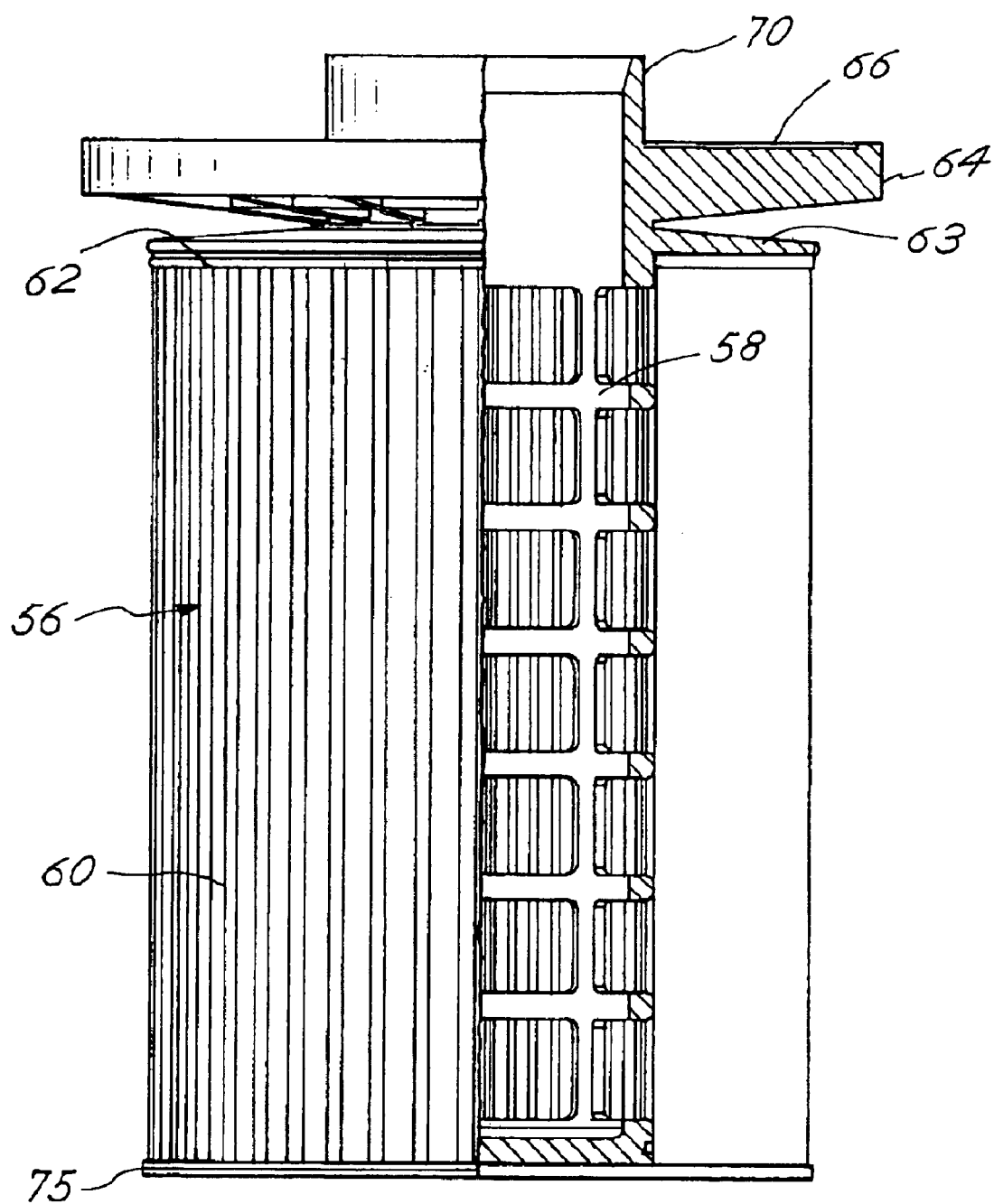
FIG. 7 is an elevation view of the particulate element assembly.

In FIG. 7 there is shown a particulate filtration filter media and core. The filter element 56 is comprised of a pleated filter media 60 bonded to an end cap 62 at one end and an end cap 75 at the other end. The core 58 is provided adjacent its upper end with an outwardly extending flange 63, which abuts the upper end cap 62 of the filter media 60, creating a sealing surface for end cap 62 and which functions to deflect fluid from the opening 42 in the stud/spacer 36, as shown by the arrows in FIG. 2. A fine mesh screen 66 preferably made from plastic, such as nylon, can be provided on the retainer 64 to remove large particulate from the flow stream.

The particulate filtration filter media of FIG. 7 can be coated with a film or layer of water sensing material, such as a water absorbent polyacrylate, in which case the filter element 56 can function to both remove particulate from the fluid stream and to sense water in the fluid stream.

Figure 8:
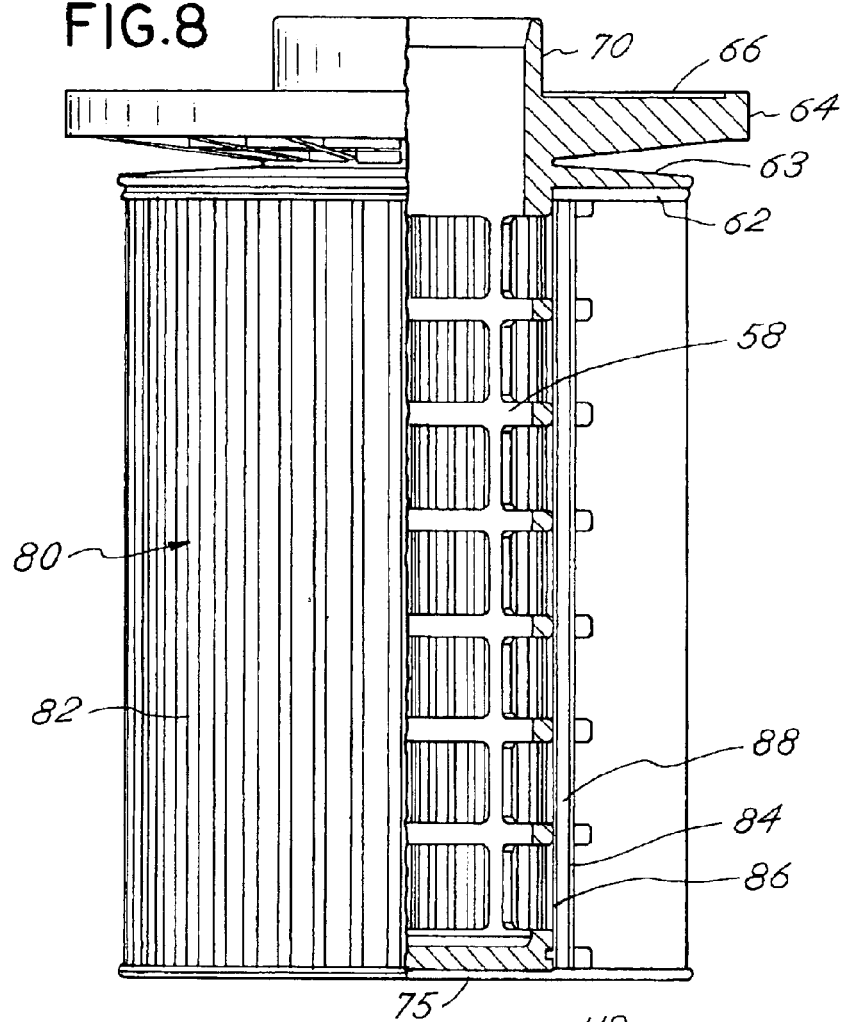
FIG. 8 an elevation view of the phase separation sensing filter element assembly.

In FIG. 8 there is shown an embodiment of filter element that can be used for phase separation sensing and particulate filtration. The filter element 80 may comprise a pleated filter media 82 bonded to an upper end cap 62 and a lower end cap 75. Concentric to the core 58 is a core 84. Disposed on the exterior of the core 58 is a layer 86 of a suitable porous sheet material, such as, a non-woven polyester, for example REEMAY. REEMAY is a trademark of REEMAY, Inc. Disposed on the interior of the core 84 is a suitable porous sheet material, such as, a non-woven polyester, for example, REEMAY. The chamber 88 between the polyester layers contains a phase separation sensing material, such as a water soluble resin and hydroxethylcellulose. An agglomerated hydroxethylcellulose is preferred. Other types of element assemblies may also be available, as would be apparent to persons skilled in the art.

Figure 9:
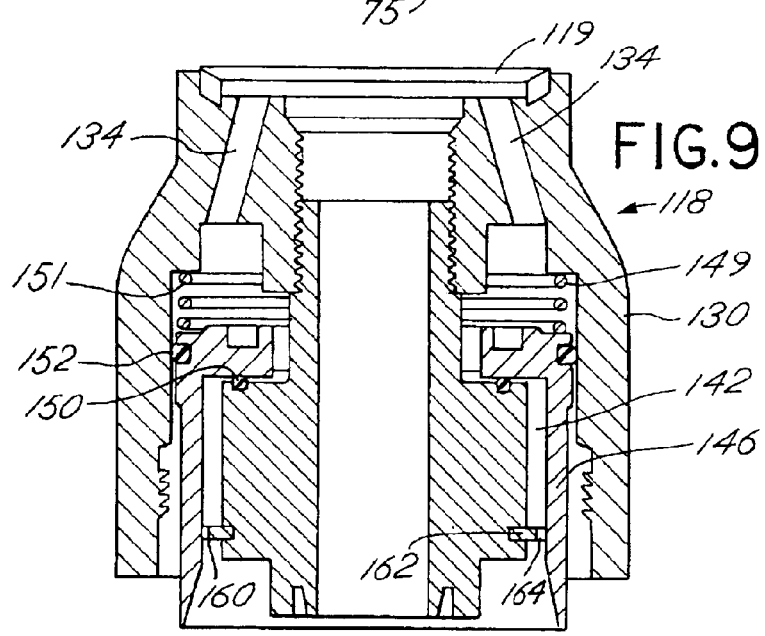
FIG. 9 is a modified adaptor embodying the invention.

FIG. 9 discloses a modified adaptor 130 having a stud/spacer 136 secured therein. A resilient seal 119, made from a suitable plastic, such as VITON, is seated in a recess at the top of the adaptor 130 and seals between the adaptor 130 and the manifold. Provided in the adaptor 130 are a plurality of openings or flow passages 134 which are arranged annularly about the longitudinal axis of the adaptor 130. The stud/spacer 136 cooperates with O-ring cup or sleeve member 146 to provide flow passage 142. The sleeve member 146 is slidably carried on the stud/spacer 136 and its movement is guided by spider 160, which comprises an annular base 162, having projections 164 spaced thereon. The annular base 162 which is in the form of a snap ring is received and retained in a recess in the stud/spacer 136. The spaced projections 164, numbering five in a presently preferred embodiment, contact and guide the sleeve member 146. Spring 149 biases the sleeve member 146 downwardly as viewed in FIG. 9.

The sleeve member 146 cooperates with the stud/spacer 136 to provide one or more passages 147 for communicating passages 134 with flow passages 142. The surface 148 of the sleeve member 146 comprises a valve surface which seats against the valve seat 150 formed by the O-ring which is seated in a groove or recess in the stud/spacer 136. When the surface 148 is engaged with the valve seat 150, the flow of fuel through the filter 18 is stopped. When the surface 148 is away from the valve seat 150, fuel can flow through the filter 118. Spring 149, which operates between should 151 on the adaptor 130 and the top of the sleeve member 146 urges the sleeve member 146 into contact with the valve seat 150 to close the flow path through the filter 118. Incoming fuel will add pressure in the valve closing. As compared to the embodiment of FIG. 2, O-rings are eliminated and a smaller spring force is needed for proper operation of the spring 149, as compared with a comparable spring 49.

In operation, the bowl 32 with a clean filter assembly 56 is secured to the adaptor 30. As the bowl 32 is threaded into the adaptor 30, the retainer 64 on the core 58 engages the lower end of the sleeve member 46 and urges the sleeve member 46 upwardly as viewed in FIG. 2 to move the valve surface 48 thereon away from the valve seat 50. Fuel can pass from the manifold 17 (FIG. 1) to which the fuel dispenser filter 18 is attached, through the flow passages 34 in adaptor 30, the flow passage 47 in the sleeve member 46, flow passage 42 in the stud/spacer 40 to the exterior of the filter element 56 in the bowl 32. The fuel will pass through the filter element 56 and be cleansed, that is, the filter element 56 will remove particulate from the fuel. The cleansed fuel will return to the manifold through the outlet passage defined within the hollow member 36.

To replace a dirty filter element 56, the bowl 32 is unscrewed from the adaptor 30. As the bowl 32 descends as viewed in FIGS. 2 and 3, the sleeve member 46 is urged downwardly by the spring 49. The surface 48 on the sleeve member 46 engages the O-ring fuel seal 50 on the stud/spacer 40. The flow of fuel through the filter 18 is stopped. O-ring seal 52 seals between the adaptor 30 and the sleeve member 46. O-ring seal 55 seals between the exterior surface of the spacer 40 and the interior surface of the sleeve member 46. It is seen that with the flow path between the sleeve member 46 and the spacer 40 closed, fluid from the manifold enters the flow passages 34 and has no place to go. The dirty filter element 56 can be properly disposed of, as can be any residual fuel in the bowl 32. In addition, when the bowl 32 is removed from the adaptor, the filter media 60 can be easily examined.

A person skilled in the art will understand that various combinations of filter media and sensing chemicals can be used in the improved fuel dispenser filter of the present invention, depending upon application. If there is no water sensing chemical laminated on the filter element 56, then the filter element 56 will function in normal fashion to remove particulate from the fuel. A water sensing chemical can be laminated to the filter media if the water sensing function is desired. A phase sensing chemical can be employed in the chamber formed in the core assembly if the phase separation sensing function is desired. The fuel dispenser filter 18 can be provided with both a water sensing chemical and a phase separation chemical if these operating functions are desired. Other modifications will be apparent to persons skilled in the art and it is intended to cover reasonable variations within the scope of the following claims.

We claim:

1. A fuel dispenser filter for filtering fuel adapted to be connected to a support, said filter comprising an adaptor means constructed and arranged to be secured to the support, flow passage means formed in the adaptor means, an outlet flow passage formed in the adaptor means, said adaptor means including a longitudinally elongated stud spacer, the stud spacer defining the outlet flow passage and being open at its ends, the stud spacer being adapted to be connected at one end to the adaptor means and being open at the opposite end, valve means for controlling the flow of fuel through the flow passage means, said valve means comprising a sleeve member movably mounted on the stud spacer and movable to a first position to stop fuel flow and movable to a second position to permit fuel flow, said stud spacer having a recess in the outer surface thereof, and spider means retained in the recess, said spider means having projections thereon for engaging the sleeve member and guiding movement of the sleeve member, a bowl detachably secured to the adaptor means, filter means including filter media for filtering particulate from the fuel passing through the filter, whereby, when the bowl is secured to the adaptor means and the filter media is in the bowl, the valve means will be opened and fuel can flow through the flow passage means to the filter media and exit from the filter through the outlet passage and when the bowl is separated from the adaptor means for replacement of the filter media, the valve means will be closed to block fuel flow through the flow passage means.

2. A fuel dispenser filter as in claim 1, wherein the filter means comprises a perforate core having the filter media carried thereon.

3. A fuel dispenser filter as in claim 2, wherein the filter media comprises pleated material and a layer of water sensing material is laminated to the exterior surface pleated material.

4. A fuel dispenser filter as in claim 3, wherein the water sensing material is a water absorbent polyacrylate.

5. A fuel dispenser filter as in claim 2, wherein the perforate core has an outwardly extending flange at the end proximate the adaptor means for directing fuel flow toward the outer surface of the filter media and preventing fuel flow from pushing the filter media off the core.

6. A fuel dispenser filter as in claim 2, wherein the perforate core has means defining a chamber formed thereon for retaining a phase separation chemical.

7. A fuel dispenser filter as in claim 6, wherein the means defining a chamber comprises a second core disposed concentric to the first core.

8. A fuel dispenser filter as in claim 7, wherein the means defining a chamber includes a porous layer on the exterior of the first core and a porous layer on the interior of the second core.

9. A fuel dispenser filter as in claim 6, wherein the core is provided with a retainer and a screen is provided in the retainer to help remove large particulate from the fuel.

10. A fuel dispenser filter as in claim 6, wherein the phase separation chemical comprises a water soluble resin and hydroxyethylcellulose.

11. A fuel dispenser filter as in claim 6, wherein the phase separation chemical comprises a water soluble resin and an agglomerated hydroxyethylcellulose.

12. A fuel dispenser filter as in claim 1, wherein said opposite end of the stud spacer is provided with a recess, and the filter media has a seal at the end adjacent the stud spacer engaging in the recess in the stud spacer for sealing fuel flow from between the seal of the filter media and the stud spacer.

13. A fuel dispenser filter as in claim 12, wherein the seal is annular and is tapered to the end and the recess is annular and has a complementary shape to the seal.

14. A fuel dispenser filter as in claim 1, including a resilient means for biasing the sleeve member toward the second position to block fluid flow through the flow passage means.

15. A fuel dispenser filter as in claim 1, wherein the resilient means comprises a coil spring operative between the adaptor means and the stud spacer.

16. A fuel dispenser filter as in claim 1, wherein the sleeve member is slidably mounted on the stud spacer, whereby when the bowl is removed from the adaptor means, the sleeve member will block the flow passage means.

17. A fuel dispenser filter for filtering fuel adapted to be connected to a support, said filter comprising a housing including an adaptor constructed and arranged to be secured to the support and a bowl operatively connected to the adaptor, a stud spacer secured in the adaptor, the stud spacer defining a centrally disposed outlet flow passage and outwardly disposed inlet flow passages, a sleeve member movably supported in the adaptor between the stud/spacer and the adaptor, the sleeve member being constructed and arranged to open and close the fuel flow through the inlet flow passages, said sleeve member being slidably carried on the stud spacer, said stud spacer including a valve seat, a surface of the sleeve member cooperating with the valve seat to stop the flow of fuel through the inlet flow passages, said stud spacer having a recess in the outer surface thereof, and a spider retained in the recess, said spider having spaced projections thereon for engaging the sleeve member and guiding the movement of the sleeve member, and filter means including filter media for filtering the fuel passing through the filter, whereby, when the bowl is firmly engaged with the adaptor and the filter media is in place, the sleeve member is moved to open position to permit the flow of fuel and when the bowl is removed from the adaptor, the sleeve member is moved to a closed position to stop the flow of fuel.

18. A fuel dispenser filter as in claim 17, including a spring disposed between the adaptor and the sleeve member for urging the sleeve member to the closed position when the bowl is removed from the adaptor.

19. A fuel dispenser filter as in claim 17, wherein the filter means comprises a perforate core made of plastic, the filter media being carried on the core, the core having an outwardly extending flange at the end proximate the adaptor for directing fuel flow toward the outer surface of the filter media.

20. A fuel dispenser filter as in claim 17, wherein the valve seat comprises an O-ring seated in a recess in the stud spacer.

21. A fuel dispenser filter as in claim 17, wherein the spider retained in the recess is annular.

22. A fuel dispenser filter as in claim 21, wherein the spider is made from plastic material in the form of a snap ring.

23. A fuel dispenser filter as in claim 17, wherein the filter media comprises pleated material and a layer of water sensing material is laminated to the exterior surface pleated material.

24. A fuel dispenser filter as in claim 23, wherein the water sensing material is a water absorbent polyacrylate.

25. A fuel dispenser filter as in claim 19, wherein the perforate core has means defining a chamber formed thereon for retaining a phase separation chemical.

26. A fuel dispenser filter as in claim 25, wherein the phase separation chemical comprises a water soluble resin and hydroxyethylcellulose.

27. A fuel dispenser filter as in claim 25, wherein the phase separation chemical comprises a water soluble resin and an agglomerated hydroxyethylcellulose.

28. A fuel dispenser filter for filtering fuel adapted to be connected to a support, said filter comprising an adaptor means constructed and arranged to be secured to the support, flow passage means formed in the adaptor means, an outlet flow passage formed in the adaptor means, valve means for controlling the flow of fuel through the flow passage means, a bowl detachably secured to the adaptor means, filter means including filter media for filtering particulate from the fuel passing through the filter, the filter means comprising a perforate core having the filter media carried thereon, said perforate core having means defining a chamber for retaining a phase separation chemical, said phase separation chemical comprises a water soluble resin and hydroxyethylcellulose, whereby, when the bowl is secured to the adaptor means and the filter media is in the bowl, the valve means will be opened and fuel can flow through the flow passage means to the filter media and exit from the filter through the outlet passage and when the bowl is separated from the adaptor means for replacement of the filter media, the valve means will be closed to block fuel flow through the flow passage means.

29. A fuel dispenser filter for filtering fuel as in claim 28, wherein said hydroxyethyl cellulose is an agglomerated hydroxethylcellulose.

* * * * *